(12) United States Patent
Hwang et al.

(10) Patent No.: US 10,743,157 B2
(45) Date of Patent: Aug. 11, 2020

(54) METHOD FOR MANAGING MODULES INCORPORATED INTO A PLURALITY OF VEHICLES, MANAGING DEVICE AND MANAGING SERVER USING THE SAME

(71) Applicant: Obigo Inc., Gyeonggi-do (KR)

(72) Inventors: Doe Yun Hwang, Seoul (KR); Doo Hyun Han, Gyeonggi-do (KR); Jung Seok Lee, Daegu (KR)

(73) Assignee: Obigo Inc., Gyeonggi-do (KR)

( * ) Notice: Subject to any disclaimer, the term of this patent is extended or adjusted under 35 U.S.C. 154(b) by 199 days.

(21) Appl. No.: 15/895,998

(22) Filed: Feb. 13, 2018

(65) Prior Publication Data

US 2018/0249308 A1  Aug. 30, 2018

(30) Foreign Application Priority Data

Feb. 24, 2017 (KR) .................. 10-2017-0024711

(51) Int. Cl.

| H04L 12/00 | (2006.01) |
| H04W 4/44 | (2018.01) |
| G05B 15/02 | (2006.01) |
| H04L 29/08 | (2006.01) |
| G07C 5/00 | (2006.01) |
| G07C 5/08 | (2006.01) |
| H04W 4/38 | (2018.01) |

(52) U.S. Cl.
CPC .............. *H04W 4/44* (2018.02); *G05B 15/02* (2013.01); *G07C 5/008* (2013.01); *G07C 5/0816* (2013.01); *H04L 67/2842* (2013.01); *H04W 4/38* (2018.02)

(58) Field of Classification Search
CPC .......... H04W 4/44; H04W 4/38; G05B 15/02; G07C 5/0816; G07C 5/008; H04L 67/2842
USPC .............. 709/223; 340/12.32; 370/22.1, 392; 701/29.2, 29.3
See application file for complete search history.

(56) References Cited

U.S. PATENT DOCUMENTS

| 7,561,025 B2 * | 7/2009 | Gerszberg .............. H04B 3/542 340/12.32 |
| 8,014,915 B2 * | 9/2011 | Jeon ....................... H04L 12/64 455/556.1 |
| 8,232,886 B2 * | 7/2012 | Kawai ................. H01M 10/425 340/636.1 |

(Continued)

*Primary Examiner* — Frantz Coby
(74) *Attorney, Agent, or Firm* — Husch Blackwell LLP (57) ABSTRACT

A method for managing modules incorporated into a plurality of vehicles is provided. The method includes steps of: a managing device (a) performing data collection for determining whether descendant modules are malfunctional, on condition that a module signal generated from an ancestor module is acquired, and that specific module data are recorded in a node of a tree data structure, and then if the specific module data are determined as corresponding to a malfunction of the ancestor module; and (b) transmitting individual malfunction information to a managing server to thereby allow the managing server to perform diagnosis on identical-type modules, where the individual malfunction information includes information on the malfunction of the ancestor module and the descendant modules, and where the identical-type modules are selected among modules of other vehicles by referring to whether each modules of said other vehicles is identical to the ancestor module and the descendant modules.

18 Claims, 6 Drawing Sheets

(56) References Cited

U.S. PATENT DOCUMENTS

| | | | | |
|---|---|---|---|---|
| 8,275,528 | B2* | 9/2012 | Kresse | B60K 6/365 |
| | | | | 701/54 |
| 9,053,636 | B2* | 6/2015 | Gordon | G08G 1/096775 |
| 9,332,261 | B2* | 5/2016 | Yousefi | H04L 12/46 |
| 9,786,102 | B2* | 10/2017 | Bullister | G07C 5/008 |
| 2007/0174663 | A1* | 7/2007 | Crawford | G06F 11/0709 |
| | | | | 714/6.1 |
| 2009/0298474 | A1* | 12/2009 | George | G10L 13/00 |
| | | | | 455/412.2 |
| 2011/0040444 | A1* | 2/2011 | Regnard De Lagny | ............ |
| | | | | B60W 50/0205 |
| | | | | 701/29.2 |
| 2011/0163597 | A1* | 7/2011 | Lin | B60R 16/03 |
| | | | | 307/9.1 |
| 2012/0106549 | A1* | 5/2012 | Yousefi | H04N 7/183 |
| | | | | 370/392 |
| 2012/0109446 | A1* | 5/2012 | Yousefi | H04N 7/183 |
| | | | | 701/29.3 |
| 2013/0124009 | A1* | 5/2013 | Esler | H04L 67/303 |
| | | | | 701/2 |
| 2015/0124589 | A1* | 5/2015 | Diab | H04L 67/327 |
| | | | | 370/221 |
| 2016/0272219 | A1* | 9/2016 | Ketfi-Cherif | B60W 50/029 |

* cited by examiner

METHOD FOR MANAGING MODULES INCORPORATED INTO A PLURALITY OF VEHICLES, MANAGING DEVICE AND MANAGING SERVER USING THE SAME

CROSS REFERENCE TO RELATED APPLICATION

This application claims priority to and incorporates herein by reference all disclosure in Korean patent application no. 10-2017-0024711 filed Feb. 24, 2017.

FIELD OF THE INVENTION

The present invention relates to a method of managing modules incorporated into a plurality of vehicles; and more particularly, to the method of a managing device, on condition that a module signal generated from an ancestor module incorporated into a specific vehicle is acquired by the managing device, and that specific module data, which are information on the ancestor module, are recorded in at least one specific node of a tree data structure for retaining specific vehicle information of the specific vehicle, and then if the specific module data are determined as corresponding to a malfunction of the ancestor module, performing or supporting another device to perform data collection for determining whether one or more descendant modules that correspond respectively to descendants of the specific node are malfunctional; and (b) the managing device transmitting or supporting another device to transmit individual malfunction information to a managing server to thereby allow the managing server to perform diagnosis on at least one of identical-type modules, where the individual malfunction information includes information on the malfunction of the ancestor module and on at least one malfunction of the descendant modules, and where the identical-type modules are selected among modules of other vehicles by referring to whether each of the modules of said other vehicles is of a type identical to module(s) of at least one of the ancestor module and the descendant modules.

BACKGROUND OF THE INVENTION

Various data generated from modules, e.g., sensors, incorporated into vehicles is stored and managed by electronic devices on the vehicles. During the data processing handled by vehicle modules commercially available, the generated data is recorded in a local storage by a means of batch designation of database tables, because selective recording is not possible. Further, there may be a cost problem like huge consumption of data transmission quota because the data is transmitted in a batch to a data center of a cloud platform, i.e., servers, as necessary.

Especially, recent introduction of electronic devices and control units to the vehicles has also brought many electronic problems, and collection and analysis of every data generated from the modules causes huge cost.

Figure 2:
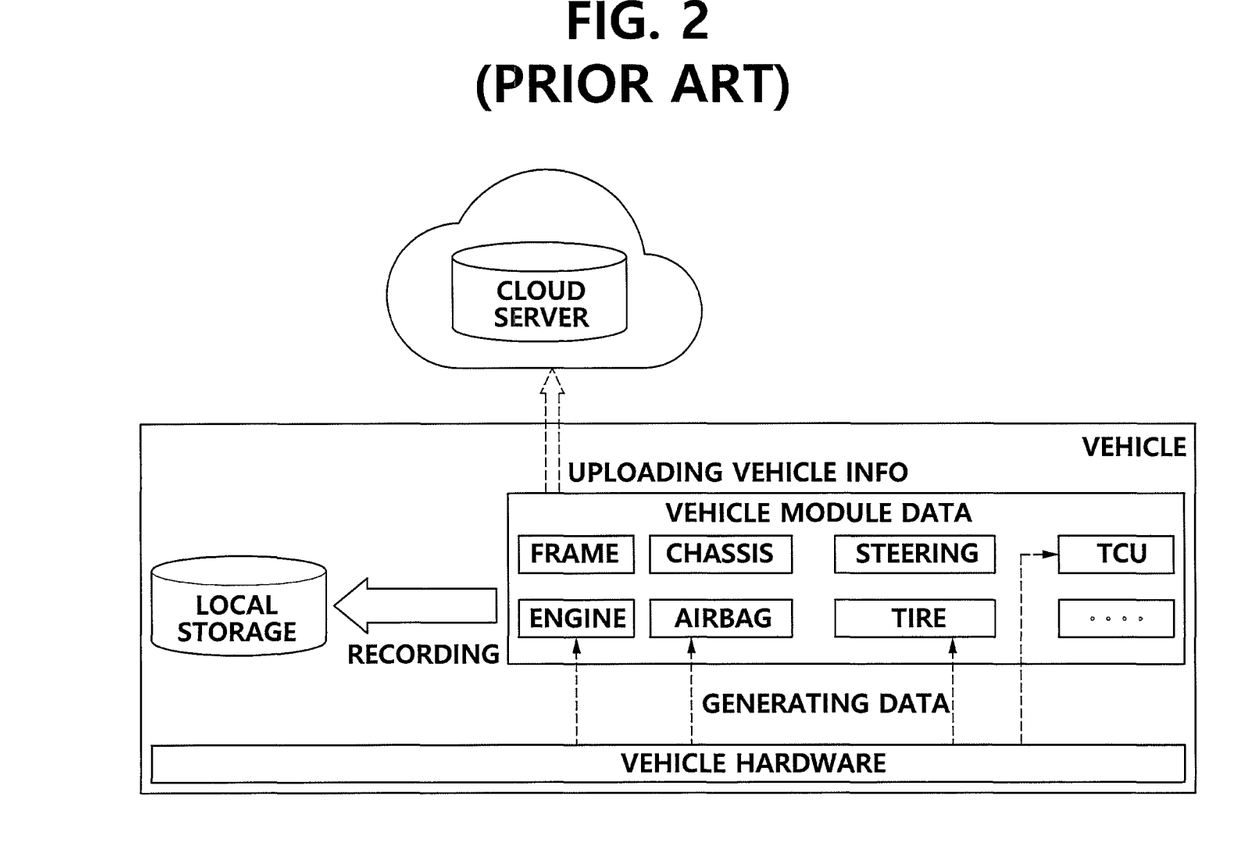
FIG. 2 is a conceptual diagram illustrating a conventional method of collecting and managing data from modules incorporated into a vehicle.

According to a conventional technology, for example, by referring to FIG. 2 illustrating a method of collecting and managing data from modules on vehicles, module data is created and recorded by a module signal generated from the modules, illustrated as 'vehicle hardware', on the vehicles, and the module data may include data of modules like a vehicle frame, an engine, a chassis, an airbag, a steering, a tire, and a TCU. Although the module data may be recorded in the local storage or the server, illustrated as a 'CLOUD SERVER', with a tree data structure, the data is transmitted from the vehicle to the server in a batch mode as illustrated in FIG. 2.

To resolve inefficiencies such as those, the inventor proposes methods and devices using the same that (i) creates and records the module data of the modules like various sensors installed on the vehicles in a general tree data structure, (ii) enables partial recording of data generated in real-time by using a node corresponding to the modules, and (iii) enables remote diagnosis on other vehicles with modules of a type identical to that of a certain module incorporated into a vehicle by referring to information on a malfunction if the malfunction occurs in the certain module.

SUMMARY OF THE INVENTION

It is an object of the present invention to solve all the aforementioned problems.

It is another object of the present invention to effectively store and manage a module signal generated from modules incorporated into a vehicle and module data generated by the module signal in a tree data structure.

It is still another object of the present invention to simplify the recording process of module data at the time of their generation by using vehicle information retained in the tree data structure.

It is still yet another object of the present invention to automatically initiate data collection on nodes corresponding to the modules having malfunction when the malfunction is detected, transmit the vehicle data and its corresponding malfunction information to a managing server to thereby instruct the managing server to perform data collection based on the information on types of modules of other vehicles, and thus remotely manage the modules.

In accordance with one aspect of the present invention, there is provided a method of managing modules incorporated into a plurality of vehicles, including steps of: (a) a managing device, on condition that a module signal generated from an ancestor module incorporated into a specific vehicle is acquired by the managing device, and that specific module data, which are information on the ancestor module, are recorded in at least one specific node of a tree data structure for retaining specific vehicle information of the specific vehicle, and then if the specific module data are determined as corresponding to a malfunction of the ancestor module, performing or supporting another device to perform data collection for determining whether one or more descendant modules that correspond respectively to descendants of the specific node are malfunctional; and (b) the managing device transmitting or supporting another device to transmit individual malfunction information to a managing server to thereby allow the managing server to perform diagnosis on at least one of identical-type modules, wherein the individual malfunction information includes information on the malfunction of the ancestor module and on at least one malfunction of the descendant modules, and wherein the identical-type modules are selected among modules of other vehicles by referring to whether each of the modules of said other vehicles is of a type identical to the module(s) of at least one of the ancestor module and the descendant modules.

In accordance with another aspect of the present invention, there is provided a method of managing modules incorporated into a plurality of vehicles, including steps of: (a) a managing server, on condition that information on the plurality of vehicles including individual module data having information on individual modules respectively incorporated into the plurality of vehicles is recorded in each node of at least one tree data structure on at least one database, acquiring or supporting another device to acquire basic malfunction information on a specific module incorporated into a specific vehicle; (b) the managing server determining or supporting another device to determine whether at least one piece of associated module data among the individual module data is recorded on the database, wherein the piece of associated module data is about at least one identical-type module, which is of a type identical to that of the specific module, selected among the individual modules incorporated into remainder of the plurality of vehicles other than the specific vehicle; and (c) the managing server performing or supporting another device to perform diagnosis on the identical-type module by referring to the piece of associated module data if the piece of associated module data is determined as recorded.

In accordance with still another aspect of the present invention, there is provided a managing device for managing modules incorporated into a plurality of vehicles, including: a communication part for acquiring or supporting another device to acquire a module signal generated from an ancestor module incorporated into a specific vehicle; and a processor, on condition that specific module data, which are information on the ancestor module, are recorded in at least one specific node of a tree data structure for retaining specific vehicle information of the specific vehicle, and then if the specific module data are determined as corresponding to a malfunction of the ancestor module, for performing or supporting another device to perform (i) a process of data collection to determine whether one or more descendant modules that correspond respectively to descendants of the specific node are malfunctional and (ii) a process for transmitting or supporting another device to transmit individual malfunction information to a managing server to thereby allow the managing server to perform diagnosis on at least one of identical-type modules, wherein the individual malfunction information includes information on the malfunction of the ancestor module and on at least one malfunction of the descendant modules, and wherein the identical-type modules are selected among modules of other vehicles by referring to whether each of the modules of said other vehicles is of a type identical to module(s) of at least one of the ancestor module and the descendant modules.

In accordance with still yet another aspect of the present invention, there is provided a managing server for managing modules incorporated into a plurality of vehicles, including: a communication part, on condition that information on the plurality of vehicles including individual module data having information on individual modules respectively incorporated into the plurality of vehicles is recorded in each node of at least one tree data structure on at least one database, acquiring or supporting another device to acquire basic malfunction information on a specific module incorporated into a specific vehicle; and a processor for (i) determining or supporting another device to determine whether at least one piece of associated module data among the individual module data is recorded on the database, wherein the piece of associated module data is about at least one identical-type module, which is of a type identical to that of the specific module, selected among the individual modules incorporated into remainder of the plurality of vehicles other than the specific vehicle; and (ii) performing or supporting another device to perform diagnosis on the identical-type module by referring to the piece of associated module data if the piece of associated module data is determined as recorded.

BRIEF DESCRIPTION OF THE DRAWINGS

The above and other objects and features of the present invention will become apparent from the following description of preferred embodiments given in conjunction with the accompanying drawings, in which.

The following drawings to be used to explain example embodiments of the present invention are only part of example embodiments of the present invention and other drawings can be obtained based on the drawings by those skilled in the art of the present invention without inventive work.

DETAILED DESCRIPTION OF THE PREFERRED EMBODIMENTS

Detailed explanation on the present invention to be made below refer to attached drawings and diagrams illustrated as specific embodiment examples under which the present invention may be implemented to make clear of purposes, technical solutions, and advantages of the present invention. These embodiments are described in sufficient detail to enable those skilled in the art to practice the invention.

Besides, in the detailed description and claims of the present invention, a term "include" and its variations are not intended to exclude other technical features, additions, components or steps. Other objects, benefits and features of the present invention will be revealed to one skilled in the art, partially from the specification and partially from the implementation of the present invention. The following examples and drawings will be provided as examples but they are not intended to limit the present invention.

Moreover, the present invention covers all possible combinations of example embodiments indicated in this specification. It is to be understood that the various embodiments of the present invention, although different, are not necessarily mutually exclusive. For example, a particular feature, structure, or characteristic described herein in connection with one embodiment may be implemented within other embodiments without departing from the spirit and scope of the present invention. In addition, it is to be understood that the position or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Unless otherwise noted in this specification or clearly contradicted in the context, an item indicated in the singular includes those in the plural, unless otherwise required in the context. These embodiments will be described in sufficient detail by referring to attached drawings regarding the embodiments of the present invention to enable those skilled in the art to practice the invention.

Figure 1:
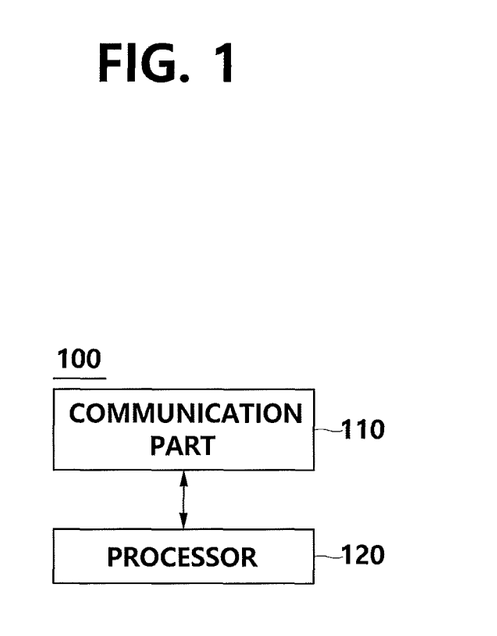
FIG. 1 is a conceptual diagram illustrating one example embodiment of a managing device and a managing server for managing modules incorporated into a plurality of vehicles in accordance with the present invention.

FIG. 1 is a conceptual diagram illustrating an example of a managing device and a managing server for managing modules incorporated into a plurality of vehicles in accordance with the present invention.

By referring to FIG. 1, the managing device and the managing server in accordance with the present invention may perform methods of the present invention by using typical combinations of a computing device 100, e.g., a computer processor, a memory, a storage, an input device, an output device, and other devices that may include components of conventional computing devices; an electronic communication device such as a router or a switch; an electronic information storage system such as a network-attached storage (NAS) device and a storage area network (SAN), and computer software, i.e., instructions that allow a computing device to function in a specific way. Such computing devices may include a communication part 110 and a processor 120, and may communicate with each other either directly or indirectly.

The communication part 110 of the computing device 100 may transmit requests and receive responses to and from other linked devices. As one example, such requests and responses may be carried out between the managing device and the managing server. As one example, such requests and responses may be carried out by the same TCP session, but the scope of the present invention is not limited thereto. For example, they could be transmitted and received as UDP datagrams.

Also, the processor 120 of the computing device 100 may include hardware configuration of an MPU (Micro Processing Unit) or a CPU (Central Processing Unit), cache memory, data bus, etc. Additionally, OS and software configuration of applications that achieve specific purposes may be further included.

Figure 5:
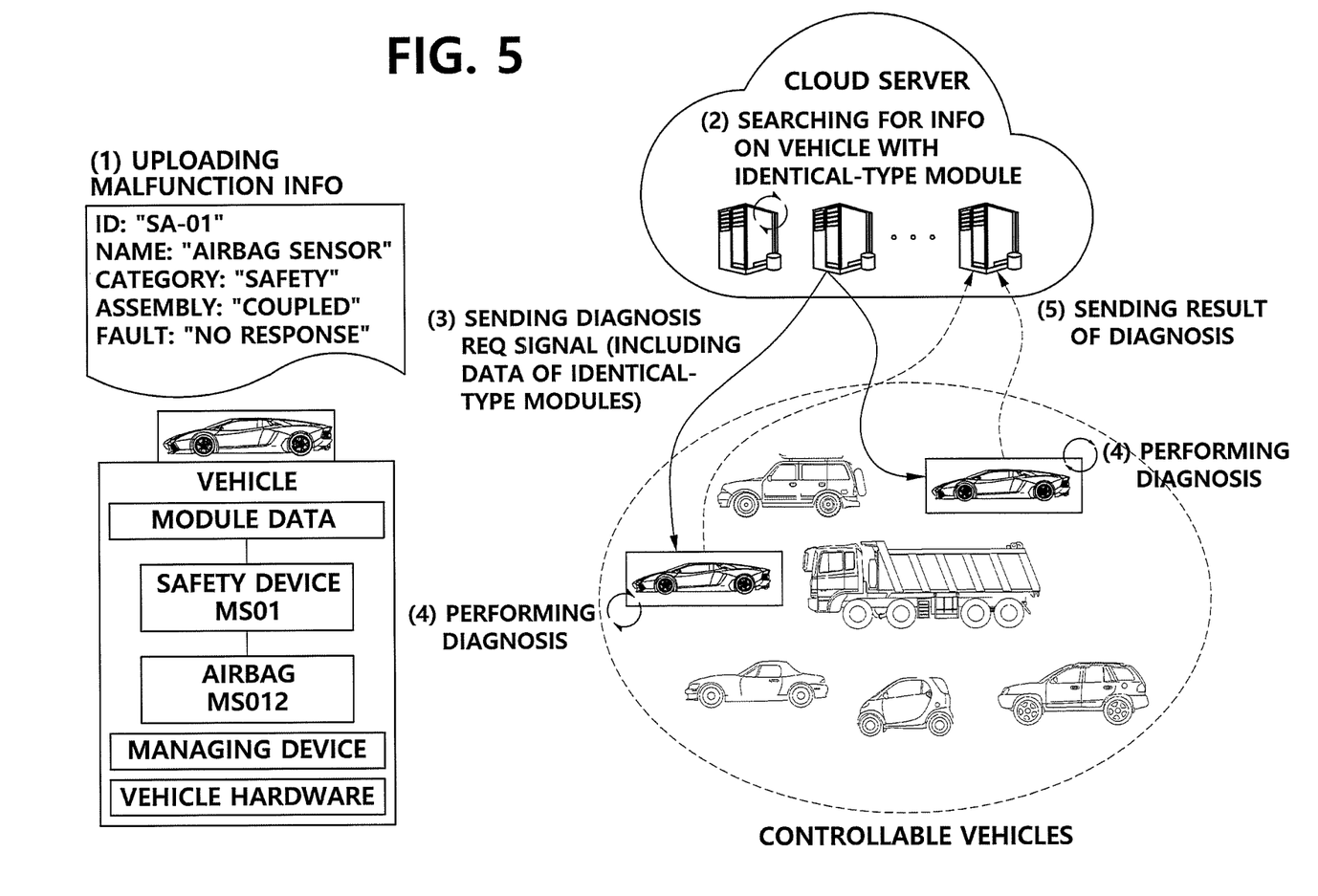
FIG. 5 is a diagram schematically illustrating a method for managing modules incorporated into the plurality of vehicles in accordance with the present invention.

Next, FIG. 5 is a diagram schematically illustrating the method for managing modules incorporated into the plurality of vehicles showing major components in accordance with the present invention.

As shown in FIG. 5, the method for managing modules in accordance with the present invention may include: a step (1) of uploading, i.e., transmitting, malfunction information on a specific module to the managing server, e.g., a cloud server, if the malfunction information is acquired by the managing device of a specific vehicle, a step (2) of searching for information on associated vehicles with identical-type modules which are of the same type with the specific module, among other vehicles controllable by the managing server, a step (3) of transmitting a diagnosis requesting signal from the managing server to the associated vehicles, a step (4) of instructing the associated vehicles to perform the diagnosis, and a step (5) of transmitting a result of the diagnosis to the managing server. Thus, integrated management of the modules incorporated into the plurality of vehicles becomes possible.

Figure 3:
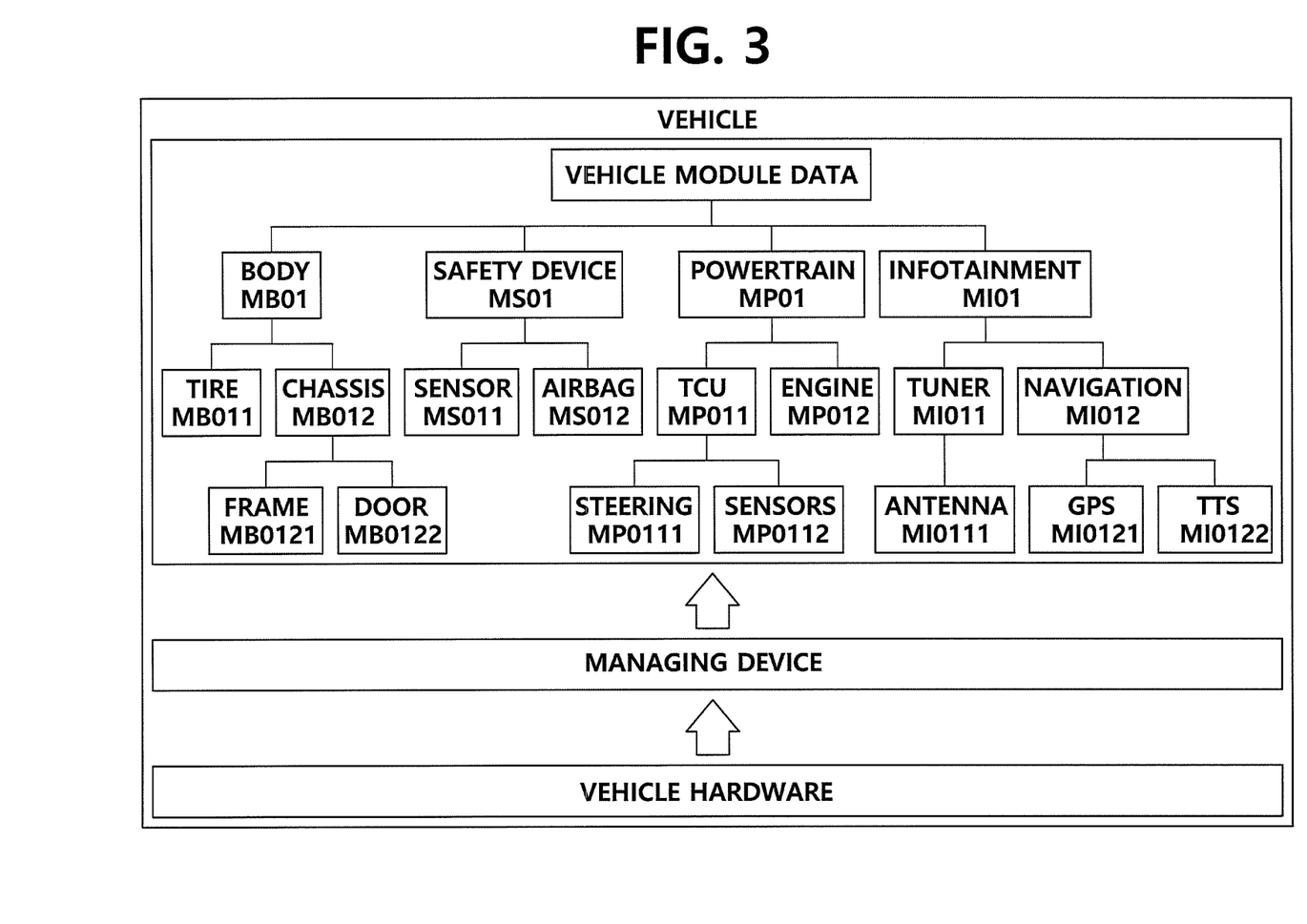
FIGS. 3 and 4 are diagrams illustrating a tree data structure including individual module data based on module signals generated from each module incorporated into the plurality of vehicles in its individual nodes in accordance with the present invention.
Figure 4:
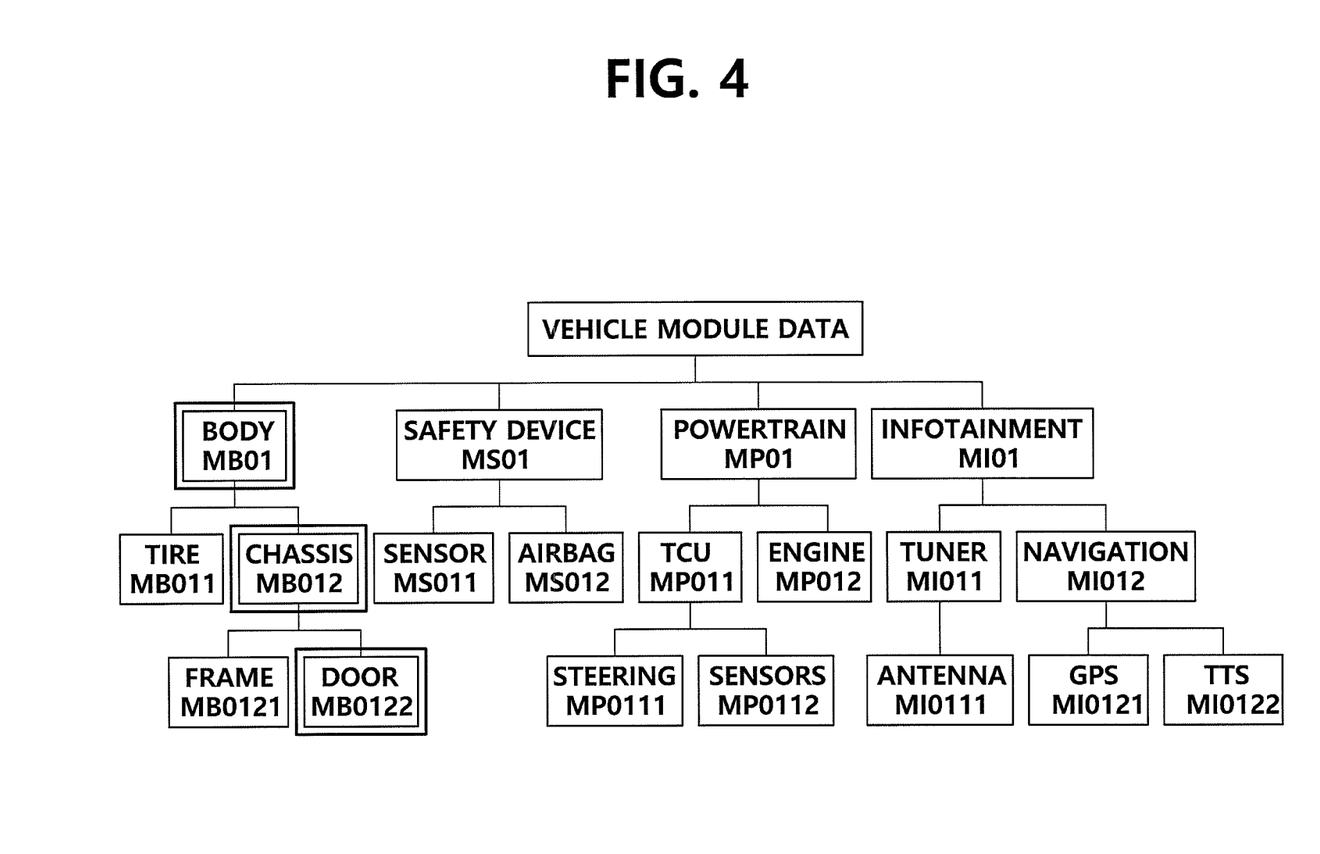
Figure 6:
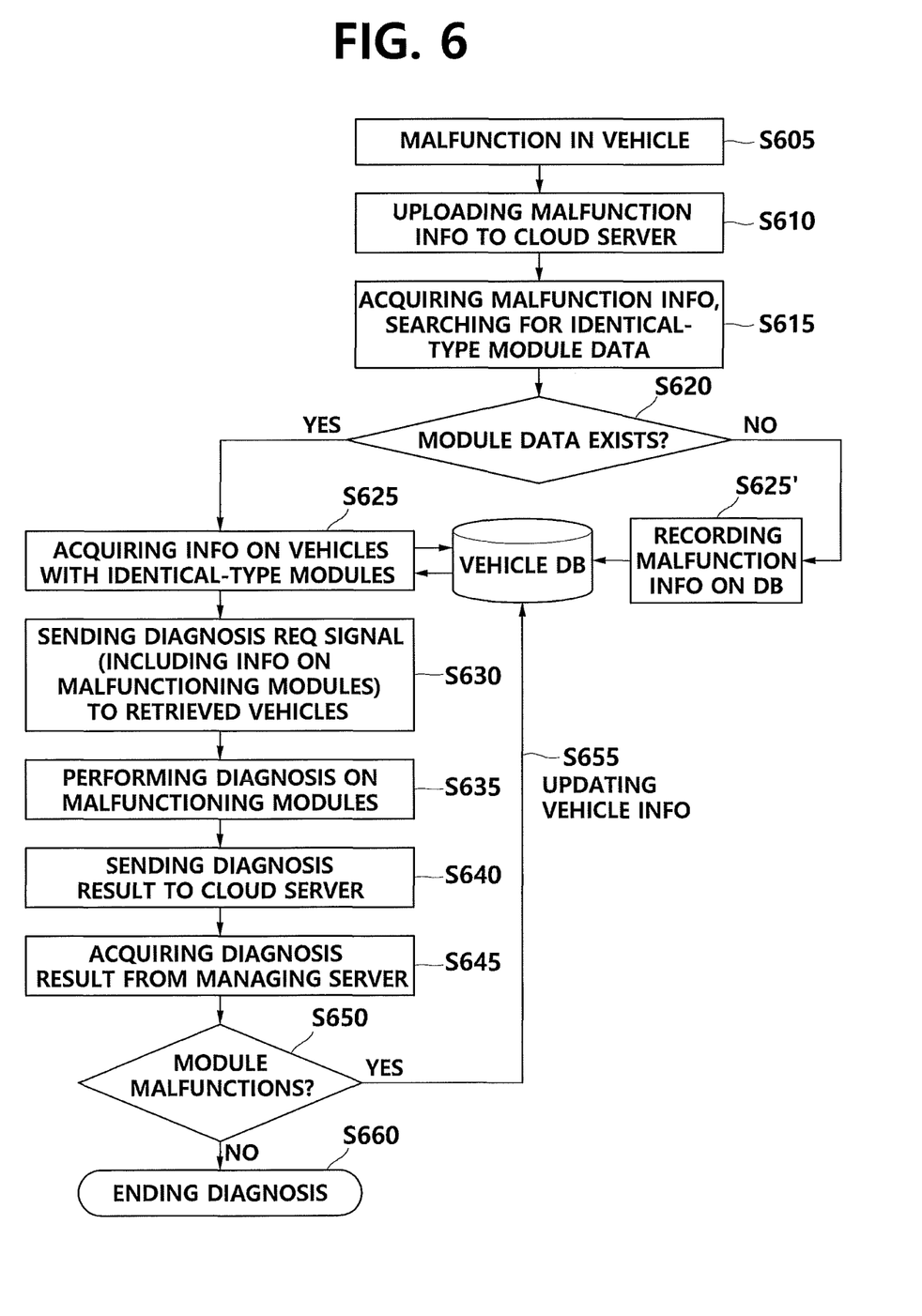
FIG. 6 is a flow chart exemplarily illustrating the method for managing the modules incorporated into the plurality of vehicles in accordance with the present invention.

First, a tree data structure is described by referring to FIGS. 3 and 4, before the method of the present invention performed by the managing device is described by referring to FIG. 6.

FIG. 3 is a diagram illustrating the tree data structure including individual module data, based on module signals generated from each module incorporated into a vehicle, in its individual nodes in accordance with the present invention. By referring to FIG. 3, a module signal generated from vehicle hardware, i.e., modules, may be reflected in module data by the managing device in accordance with the present invention, and the module data may be recorded and managed in a local storage of each of the plurality of vehicles or the managing server, as vehicle information. Each node in the tree data structure may be represented in a hierarchical diagram showing modules incorporated into a vehicle.

FIG. 4 is a diagram exemplarily illustrating related parts, i.e., nodes that are referred to by the indices MB01, MB012, and MB0122, whose module data are recorded if the module signal is generated from the door module of the vehicle, and by referring to FIG. 4, as the module data of the nodes whose indices are MB01, MB012, and MB0122, which are related to the node whose index is MB0122, are recorded, it can be seen that the processes are applied to the nodes whose indices are MB01, MB012, and MB0122 which are arranged vertically, without regard to other nodes in single bordered boxes.

For reference, in FIGS. 3 and 4, alphanumerics shown below the names of illustrated modules may be examples of indices for identifying each module.

The tree data structure as such may be recorded in the local storage of the specific vehicle, but the scope of the present invention is not limited thereto. A data structure as such may be recorded in an external device, for example, in the managing server in accordance with the present invention as described later.

Below, the method in accordance with the present invention performed by the managing device is described in further detail by referring to FIG. 6.

FIG. 6 is a flowchart illustrating exemplarily the method for managing modules in accordance with the present invention.

The method for managing modules in accordance with the present invention may be performed, on condition that the module signal generated from the specific module incorporated into the specific vehicle is acquired by the managing device, and the module data of the specific module is recorded in a specific node of the tree data structure for retaining vehicle information on the specific vehicle, at a step of S600 (not illustrated).

Describing the step S600 in detail, if the module signal is acquired then the managing device may determine whether the specific node exists in the tree data structure, at a step of S600-1 (not illustrated). The managing device then may perform (i) a process of recording the specific module data by injecting the specific module data into the specific node if the specific node is determined as existent at a step of S600-2a (not illustrated), and (ii) a process of recording the specific module data by creating a new node in the tree data structure and then by injecting the specific module data into the new node, if the specific node is determined as non-existent at a step of S600-2b (not illustrated).

At the step of S600-2b, the managing device may create the new node in the tree data structure and its corresponding index. If the index is created then the managing device may determine whether the specific node exists in the tree data structure by referring to the index corresponding to the specific node, at the step of S600-1. For example, if a module signal is generated from a module corresponding to the node referred to by the index MB0122 in FIG. 4, in order to determine whether the node for recording the module data exists, the managing device may sequentially determine whether the modules "MB01", "MB012", and "MB0122" exist.

Further, the step of S600-2b may be performed mainly at the registration of a new module, and the first time the method for managing modules in accordance with the present invention is performed, every module in a vehicle may be new module(s), therefore in this case, a first tree data structure is created by the managing device.

Additionally, after the first tree data structure is created, for example, if a sensor module is newly registered, the managing device may monitor the status of the sensor module. In other words, a module signal generated from the sensor module may be acquired by the managing device.

Referring to FIG. 6 again, the method for managing modules in accordance with the present invention, at the step of S600, if the module data are determined as corresponding to the malfunction of the specific module, may include a step of S605 where the managing device collects data for determining whether a descendant module has any malfunction which corresponds to a descendant node of the specific node. Herein, the specific module is an ancestor module.

For example, if a diagnostic trouble code of the aforementioned sensor module, that is, a code for identifying the malfunction of the specific module is generated, the module data may be determined as corresponding to the malfunction of the specific module, and this determination may initiate data collecting on descendant modules corresponding to descendant nodes of the ancestor node corresponding to the sensor module. In one example embodiment of the present invention, analysis on whether the malfunction confirmed by using the module signal is just a simple noise, and on the point of time and a detailed occurrence pattern of the confirmed malfunction may be performed.

The data collected at the step of S605 may be recorded in the tree data structure as in the steps of S600-1 to S600-2b.

At the step of S605, in addition to the data collection on the descendant modules, the data collection on the specific module, i.e., the ancestor module of the descendant modules, corresponding to the specific node may also be performed. This is for improved reliability of the determination of the malfunction by collecting data in a way different from the signal generating process of the specific module.

Next, the method for managing modules may further include a step of S610 where the managing device transmits or supports another device to transmit individual malfunction information to the managing server to thereby allow the managing server to perform diagnosis on at least one of identical-type modules, where the individual malfunction information has information on the malfunction of the ancestor module and on at least one malfunction of the descendant modules, and where the identical-type modules are selected among modules of other vehicles by referring to whether each of the modules of said other vehicles is of a type identical to the module(s) of at least one of the ancestor module and the descendant modules. Herein, the ancestor module is the specific module.

For example, the malfunction information may include at least one of (i) a module ID for identifying a malfunctional module having the malfunction, (ii) a name of the malfunctional module, (iii) a category of the malfunctional module, (iv) an assembly type of the malfunctional module, and (v) detailed information on the malfunction. Herein, the detailed information includes at least one of (i) a code for identifying the malfunction and (ii) information on the identical-type modules. Herein, the module IDs may be assigned to the individual modules, and may be identical or different from the indices for identifying different nodes.

The aforementioned steps of S600 to S610 are performed by the managing device, and the rest of the steps of the method for managing modules of the present invention will be described from the point of view of the managing server, wherein the malfunction information of the specific module is transmitted to the managing server and the diagnosis on the identical-type modules is performed by the managing server.

Further, by referring to FIG. 6, the method for managing modules of the present invention may include a step of S615 where the managing server acquires or supports another device to acquire basic malfunction information on the specific module, on condition that information on the plurality of vehicles including the individual module data which is information on the individual modules respectively incorporated into the plurality of vehicles is recorded in each node of at least one of the tree data structures on at least one of the databases. Herein, the database may be the vehicle database as illustrated in FIG. 6, and the vehicle database may be a database that manages vehicle information on the plurality of vehicles.

Next, the method for managing modules of the present invention may further include a step of S620 where the managing server determines or supports another device to determine whether at least one piece of associated module data among the individual module data is recorded on the database, where the piece of associated module data is about at least one of the identical-type modules, which are of a type identical to that of the specific module, selected among the individual modules incorporated into remainder of the plurality of vehicles other than the specific vehicle.

Also, the method for managing modules of the present invention may further include steps of S625 to S655, where the managing server performs or supports another device to perform diagnosis on the identical-type module by referring to the piece of associated module data if the piece of associated module data is determined as recorded at the step of S620.

Specifically, the step of S625 may be included where the managing server acquires the vehicle information on at least one of the associated vehicles with the identical-type modules from the database. After the step of S625, (i) a step of S630 where the managing server transmits or supports another device to transmit a diagnosis requesting signal to the associated vehicle by referring to the information on the associated vehicle, (ii) a step of S635 where the managing server instructs or supports another device to instruct the associated vehicle to perform diagnosis in response to the diagnosis requesting signal, and (iii) a step of S640 where the associated vehicle transmits or supports another device to transmit the result of the diagnosis to the managing server, may further be included.

Herein, the associated vehicle which receives the diagnosis requesting signal may be limited to vehicles capable of communicating with the managing server among vehicles corresponding to the acquired vehicle information. Further, those skilled in the art may understand that the vehicles corresponding to the acquired vehicle information that can become communicable by repeated transmission within a certain time window may also receive the diagnosis requesting signal, even though the vehicles may not be communicable with the managing server at the time.

Herein, the diagnosis requesting signal may include the module ID, and the result of the diagnosis may include at least one of (i) the piece of associated module data, (ii) information on whether the identical-type module has any malfunction and (iii) information on the malfunction of the identical-type module if the identical-type module is determined as malfunctional.

Additionally, steps of S645 to S655 may further be included, where, if additional malfunction information representing that the identical-type module is malfunctional is acquired from the result of the diagnosis transmitted from the associated vehicle at the steps of S645 and S650, the managing server updates or supports another device to update the database so that the information on the associated vehicle recorded in the database includes the additional malfunction information at the step of S655.

Meanwhile, the method for managing modules of the present invention may further include a step of S625' where the managing server records or supports another device to record the basic malfunction information in the database if the piece of associated module data is determined as not recorded. This may enable the managing server, by recording the malfunction information in the database, to perform diagnosis on the identical-type module of a vehicle A by referring to the recorded malfunction information, at the time of registration of the information on the vehicle A with the database.

The information recorded in the database through the aforementioned steps may be utilized by the managing server for collecting and analyzing (i) frequency of the malfunction information of the individual modules and (ii) information on modules related to the malfunction information.

The present invention has an effect of efficient recording and managing data of the modules incorporated into the vehicles, over all the aforementioned embodiments in accordance with the present invention.

The advantages of the techniques herein described in the embodiments are that the recording process of the module data is simplified, and that the diagnosis and management of the modules incorporated into the plurality of vehicles becomes efficient through the integrated management of the malfunction information corresponding to the malfunctional module.

The present invention has another effect of improving efficiency by recording and managing of the module signals generated from the modules incorporated into the vehicles in the tree data structure.

The present invention has still another effect of simplifying data recording processes by managing the module signals and the module data in the tree data structure.

The present invention has still yet another effect of proficient managing of the modules incorporated into the plurality of vehicles, by automatically collecting data on nodes corresponding to the malfunctional module and transmitting the collected information to the managing server at the time of detecting the malfunction of the module in the specific vehicle and enabling the managing server to perform data collection on the associated vehicle based on the information.

Based on the explanation of the above embodiments, those skilled in the art can clearly understand that the present invention may be implemented by combination of software and hardware or hardware alone. The part contributing to the prior art or the object of a technical solution of the present invention may be implemented in a form of executable program command through a variety of computer components and may be manufactured as a computer program product or computer readable media including the product. The computer readable media or the product may include solely or in combination, program commands, data files, and data structures. The program commands included in the media or the product may be components specially designed for the present invention or may be known and usable to a skilled human in a field of computer software. The computer readable media for the product may include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands may include not only a machine language code made by a complier but also a high level code that can be used by an interpreter etc., which is executed by a computer. The aforementioned hardware device may work as more than a software module to perform the action of the present invention and they may do the same in the opposite case. The hardware device may include a processor such as a CPU or a GPU, combined with a memory device such as ROM or RAM to store the program commands, configured to execute the commands stored in the memory, and a communication part which can exchange signals with external devices. In addition, the hardware device may include a keyboard, a mouse, and any other external input device to receive commands prepared by developers.

As seen above, the present invention has been explained by specific matters such as detailed components, limited embodiments, and drawings. They have been provided only to help more general understanding of the present invention. It, however, will be understood by those skilled in the art that various changes and modification may be made from the description without departing from the spirit and scope of the invention as defined in the following claims.

Accordingly, the thought of the present invention must not be confined to the explained embodiments, and the following patent claims as well as everything including variations equal or equivalent to the patent claims pertain to the category of the thought of the present invention.

What is claimed is:

1. A method of managing modules incorporated into a plurality of vehicles, comprising steps of:
   (a) a managing device, on condition that a module signal generated from an ancestor module incorporated into a specific vehicle is acquired by the managing device, and that specific module data, which are information on the ancestor module, are recorded in at least one specific node of a tree data structure for retaining specific vehicle information of the specific vehicle, and then if the specific module data are determined as corresponding to a malfunction of the ancestor module, performing or supporting another device to perform data collection for determining whether one or more descendant modules that correspond respectively to descendants of the specific node are malfunctional; and
   (b) the managing device transmitting or supporting another device to transmit individual malfunction information to a managing server to thereby allow the managing server to perform diagnosis on at least one of identical-type modules, wherein the individual malfunction information includes information on the malfunction of the ancestor module and on at least one malfunction of the descendant modules, and wherein the identical-type modules are selected among modules of other vehicles by referring to whether each of the modules of said other vehicles is of a type identical to module(s) of at least one of the ancestor module and the descendant modules.

2. The method of claim 1, before the step of the managing device performing or supporting another device to perform data collection for determining whether one or more descendant modules that correspond respectively to descendants of the specific node are malfunctional, further comprising steps of:
the managing device determining or supporting another device to determine whether the specific node exists in the tree data structure if the module signal is acquired, wherein the specific node is for recording the specific module data as part of specific vehicle information of the specific vehicle; and
the managing device performing or supporting another device to perform (i) a process of recording the specific module data by injecting the specific module data into the specific node if the specific node exists, and (ii) a process of recording the specific module data by creating a new node in the tree data structure and then by injecting the specific module data into the new node, if the specific node does not exist.

3. The method of claim 2, wherein, at the step of determining or supporting another device to determine whether the specific node exists in the tree data structure if the module signal is acquired, the managing device refers to or supports another device to refer to an index corresponding to the specific node, to thereby determine whether the specific node exists in the tree data structure.

4. The method of claim 2, wherein, at the process of recording the specific module data by creating the new node in the tree data structure and then by injecting the specific module data into the new node, if the specific node does not exist, the managing device creates or supports another device to create the new node in the tree data structure and its corresponding index.

5. The method of claim 1, wherein the individual malfunction information includes at least one of (i) a module ID for identifying a malfunctional module having the malfunction, (ii) a name of the malfunctional module, (iii) a category of the malfunctional module, (iv) an assembly type of the malfunctional module, and (v) detailed information on the malfunction.

6. The method of claim 5, wherein the detailed information includes at least one of (i) a code for identifying the malfunction and (ii) information on the identical-type modules.

7. The method of claim 1, wherein the tree data structure is recorded in a local storage of the specific vehicle.

8. A method of managing modules incorporated into a plurality of vehicles, comprising steps of:
(a) a managing server, on condition that information on the plurality of vehicles including individual module data having information on individual modules respectively incorporated into the plurality of vehicles is recorded in each node of at least one tree data structure on at least one database, acquiring or supporting another device to acquire basic malfunction information on a specific module incorporated into a specific vehicle;
(b) the managing server determining or supporting another device to determine whether at least one piece of associated module data among the individual module data is recorded on the database, wherein the piece of associated module data is about at least one identical-type module, which is of a type identical to that of the specific module, selected among the individual modules incorporated into remainder of the plurality of vehicles other than the specific vehicle; and
(c) the managing server performing or supporting another device to perform diagnosis on the identical-type module by referring to the piece of associated module data if the piece of associated module data is determined as recorded.

9. The method of claim 8, after the step of determining or supporting another device to determine whether at least one piece of associated module data among the individual module data is recorded on the database, further comprising a step of:
the managing server recording or supporting another device to record the basic malfunction information in the database if the piece of associated module data is not recorded.

10. The method of claim 8, wherein the step of performing or supporting another device to perform diagnosis on the identical-type module by referring to the piece of associated module data if the piece of associated module data is determined as recorded including steps of:
the managing server acquiring or supporting another device to acquire information on at least one associated vehicle having the identical-type module other than the specific vehicle from the database;
the managing server transmitting or supporting another device to transmit a diagnosis requesting signal to the associated vehicle by referring to the information on the associated vehicle to thereby allow the associated vehicle to perform diagnosis in response to the diagnosis requesting signal and to transmit a result of the diagnosis to the managing server; and
the managing server, if additional malfunction information representing that the identical-type module is malfunctional is acquired from the result transmitted by the associated vehicle, updating or supporting another device to update the database so that the information on the associated vehicle includes the additional malfunction information.

11. The method of claim 8, wherein the information on at least one associated vehicle having the identical-type module other than the specific vehicle includes at least one of (i) a module ID for identifying a malfunctional module having the malfunction, (ii) a name of the malfunctional module, (iii) a category of the malfunctional module, (iv) an assembly type of the malfunctional module, and (v) detailed information on the malfunction.

12. The method of claim 10, wherein the diagnosis requesting signal includes a module ID for identifying the identical-type module and wherein the result of the diagnosis includes at least one of (i) the piece of associated module data, (ii) information on whether the identical-type module has any malfunction and (iii) information on the malfunction of the identical-type module if the identical-type module is determined as malfunctional.

13. A managing device for managing modules incorporated into a plurality of vehicles, comprising:
a communication part for acquiring or supporting another device to acquire a module signal generated from an ancestor module incorporated into a specific vehicle; and
a processor, on condition that specific module data, which are information on the ancestor module, are recorded in at least one specific node of a tree data structure for retaining specific vehicle information of the specific vehicle, and then if the specific module data are determined as corresponding to a malfunction of the ancestor module, for performing or supporting another device to perform (i) a process of data collection to determine whether one or more descendant modules that correspond respectively to descendants of the specific node are malfunctional and (ii) a process for transmitting or supporting another device to transmit individual malfunction information to a managing server to thereby allow the managing server to perform diagnosis on at least one of identical-type modules, wherein the individual malfunction information includes information on the malfunction of the ancestor module and on at least one malfunction of the descendant modules, and wherein the identical-type modules are selected among modules of other vehicles by referring to whether each of the modules of said other vehicles is of a type identical to module(s) of at least one of the ancestor module and the descendant modules.

14. The managing device of claim 13, before the process of data collection to determine whether one or more descendant modules that correspond respectively to descendants of the specific node are malfunctional, further comprising processes of:
the processor determining or supporting another device to determine whether the specific node exists in the tree data structure if the module signal is acquired, wherein the specific node is for recording the specific module data as part of specific vehicle information of the specific vehicle; and
the processor performing or supporting another device to perform a process of recording the specific module data by injecting the specific module data into the specific node if the specific node exists, and a process of recording the specific module data by creating a new node in the tree data structure and then by injecting the specific module data into the new node, if the specific node does not exist.

15. The managing device of claim 14, wherein, at the process of recording the specific module data by creating the new node in the tree data structure and then by injecting the specific module data into the new node, if the specific node does not exist, the processor creates or supports another device to create the new node in the tree data structure and its corresponding index.

16. A managing server for managing modules incorporated into a plurality of vehicles, comprising:
a communication part, on condition that information on the plurality of vehicles including individual module data having information on individual modules respectively incorporated into the plurality of vehicles is recorded in each node of at least one tree data structure on at least one database, acquiring or supporting another device to acquire basic malfunction information on a specific module incorporated into a specific vehicle; and
a processor for (i) determining or supporting another device to determine whether at least one piece of associated module data among the individual module data is recorded on the database, wherein the piece of associated module data is about at least one identical-type module, which is of a type identical to that of the specific module, selected among the individual modules incorporated into remainder of the plurality of vehicles other than the specific vehicle; and (ii) performing or supporting another device to perform diagnosis on the identical-type module by referring to the piece of associated module data if the piece of associated module data is determined as recorded.

17. The managing server of claim 16, after the process of determining or supporting another device to determine whether at least one piece of associated module data among the individual module data is recorded on the database, further comprising a process of:
the processor recording or supporting another device to record the basic malfunction information in the database if the piece of associated module data is not recorded.

18. The managing server of claim 16, wherein the process of performing or supporting another device to perform diagnosis on the identical-type module by referring to the piece of associated module data if the piece of associated module data is determined as recorded, includes processes of the processor acquiring or supporting another device to acquire information on at least one associated vehicle having the identical-type module other than the specific vehicle from the database; the processor transmitting or supporting another device to transmit a diagnosis requesting signal to the associated vehicle by referring to the information on the associated vehicle to thereby allow the associated vehicle to perform diagnosis in response to the diagnosis requesting signal and to transmit a result of the diagnosis to the managing server; and the processor, if additional malfunction information representing that the identical-type module is malfunctional is acquired from the result transmitted by the associated vehicle, updating or supporting another device to update the database so that the information on the associated vehicle includes the additional malfunction information.

* * * * *